US 8,130,469 B2

(12) United States Patent
Yao

(10) Patent No.: US 8,130,469 B2
(45) Date of Patent: Mar. 6, 2012

(54) SUSPENSION, HEAD GIMBAL ASSEMBLY AND/OR DISK DRIVE UNIT INCLUDING OUTRIGGER WITH SPRING BEAMS, AND/OR MANUFACTURING METHOD THEREOF

(75) Inventor: MingGao Yao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1246 days.

(21) Appl. No.: 11/878,872

(22) Filed: Jul. 27, 2007

(65) Prior Publication Data

US 2008/0297948 A1 Dec. 4, 2008

(30) Foreign Application Priority Data

May 28, 2007 (CN) .......................... 2007 1 0109281

(51) Int. Cl.
*G11B 5/48* (2006.01)
(52) U.S. Cl. .................................. 360/245.3; 360/245.6
(58) Field of Classification Search ............... 360/244.2, 360/245, 245.2, 245.3, 245.4, 294.4, 245.6, 360/245.7
See application file for complete search history.

(56) References Cited

U.S. PATENT DOCUMENTS

| | | | | |
|---|---|---|---|---|
| 6,055,132 A * | 4/2000 | Arya et al. ................. | 360/245.9 |
| 6,078,476 A * | 6/2000 | Magee et al. .............. | 360/294.3 |
| 6,118,637 A * | 9/2000 | Wright et al. ............. | 360/294.4 |
| 6,246,552 B1 * | 6/2001 | Soeno et al. ............... | 360/294.4 |
| 6,266,212 B1 * | 7/2001 | Coon ......................... | 360/234.5 |
| 6,297,936 B1 * | 10/2001 | Kant et al. ................. | 360/294.4 |
| 6,320,730 B1 * | 11/2001 | Stefansky et al. .......... | 360/294.4 |
| 6,466,413 B1 * | 10/2002 | Takasugi ..................... | 360/245.9 |
| 6,549,375 B1 * | 4/2003 | Crane et al. ................. | 360/245.3 |
| 6,653,761 B2 * | 11/2003 | Fujii et al. ..................... | 310/333 |
| 6,927,945 B2 * | 8/2005 | Yao et al. .................... | 360/294.3 |
| 6,952,330 B1 * | 10/2005 | Riddering et al. .......... | 360/294.7 |
| 7,006,333 B1 * | 2/2006 | Summers ..................... | 360/294.4 |
| 7,298,593 B2 * | 11/2007 | Yao et al. .................... | 360/294.4 |
| 7,317,595 B2 * | 1/2008 | Tsuchida et al. ............ | 360/245.3 |
| 7,375,930 B2 * | 5/2008 | Yang et al. .................. | 360/294.4 |
| 7,408,745 B2 * | 8/2008 | Yao et al. ..................... | 360/294.4 |
| 7,417,820 B2 * | 8/2008 | Otsuki et al. ..................... | 360/75 |
| 7,609,487 B2 * | 10/2009 | Yao et al. .................... | 360/294.1 |
| 7,612,967 B2 * | 11/2009 | Kwon et al. ................ | 360/294.4 |
| 7,719,798 B2 * | 5/2010 | Yao ............................. | 360/294.4 |
| 7,768,746 B2 * | 8/2010 | Yao et al. ..................... | 360/294.4 |
| 7,843,666 B2 * | 11/2010 | Yao et al. .................... | 360/245.3 |
| 2003/0168935 A1 | 9/2003 | Ogawa et al. | |
| 2007/0115591 A1 * | 5/2007 | Yao et al. .................... | 360/245.3 |
| 2008/0297948 A1 * | 12/2008 | Yao ............................. | 360/294.4 |

* cited by examiner

*Primary Examiner* — Brian Miller
(74) *Attorney, Agent, or Firm* — Nixon & Vanderhye PC

(57) ABSTRACT

A suspension for a HGA includes a flexure having a tongue region and an outrigger. The outrigger has a pair of rigid beams and a pair of spring beams. The pair of spring beams enables the flexure to possess favorable flexibility and assists a slider to have enough displacement. The pair of rigid beams provides the flexure enough stiffness which not only successfully prevents the HGA with the outrigger from suspension deformation and dimple separation, but also assists to improve shock performance of the HGA. Furthermore, such configuration of the suspension provides the slider a good static performance and thus improves dynamic performance of the HGA. The present invention also discloses a HGA with the suspension, a manufacturing method of the HGA, and a drive unit with such an HGA.

18 Claims, 12 Drawing Sheets

SUSPENSION, HEAD GIMBAL ASSEMBLY AND/OR DISK DRIVE UNIT INCLUDING OUTRIGGER WITH SPRING BEAMS, AND/OR MANUFACTURING METHOD THEREOF

This application claims priority to Chinese Application No. 200710109281.4 filed May 28, 2007, the entire contents of which are hereby incorporated by reference.

FIELD OF THE INVENTION

The present invention relates to an information recording disk drive unit, and more particularly to a suspension for a head gimbal assembly (HGA) with a micro-actuator, a HGA and its manufacturing method, and disk drive unit with the same.

BACKGROUND OF THE INVENTION

Disk drives are information storage devices that use magnetic media to store data and a movable read/write head positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult to quickly and accurately position the read/write head over the desired information tracks on the disk. Thus, disk drive manufacturers are constantly seeking ways to improve the positional control of the read/write head in order to take advantage of the continual increases in track density. At present, various open literatures have disclosed ways of positional control of the read/write head, for example, U.S. Patent No. 2003-0168935, entitled "Piezoelectric Driving Device".

One approach that has been effectively used by disk drive manufacturers to improve the positional control of read/write heads for higher density disks is to employ a voice coil motor (VCM). Referring to FIG. 1a, a conventional disk drive device using VCM typically has a drive arm 104, a HGA 106 attached to and mounted on the drive arm 104, a stack of magnetic disks 101 suspending the HGA 106, and a spindle motor 102 for spinning the disks 101. The employed VCM is denoted by reference number 105 and is connected to the drive arm 104 for controlling the motion of the drive arm 104 and, in turn, controlling a slider 103 of the HGA 106 to position with reference to data tracks across the surface of the magnetic disk 101, thereby enabling the read/write head imbedded in the slider 103 to read data from or write data to the disk 101. However, because the inherent tolerances of the VCM 105 and the HGA 106 exist in the displacement of the slider 103 by employing VCM 105 alone, the slider 103 cannot achieve quick and fine position control which adversely impacts the ability of the read/write head to accurately read data from and write data to the disk 101.

In order to solve the problem, an additional actuator, for example a PZT micro-actuator, is introduced in the disk drive device in order to modify or fine tune the displacement of the slider 103. The PZT micro-actuator corrects the displacement of the slider 103 on a much smaller scale, as compared to the VCM, in order to compensate for the resonance tolerance of the VCM and/or the HGA. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator enables the disk drive device to have a significant increase in the surface recording density of the information storage disks used therein.

Referring to FIGS. 1a and 1b, the PZT micro-actuator has two PZT elements denoted by reference number 107 and mounted within the HGA 106 which further includes the slider 103 and a suspension 110 to support the slider 103 and the PZT elements 107 of the micro-actuator. The suspension 110 comprises a flexure 111, a slider support 112 with a bump 112a formed thereon, a metal base 113 and a load beam 114 with a dimple 114a formed thereon for supporting the slider support 112 and the metal base 113. The slider 103 is partially mounted on the slider support 112 with the bump 112a supporting the center of the back surface of the slider 103. Specifically, the flexure 111 provides a plurality of traces thereon. The traces of the flexure 111 couple the slider support 112 and the metal base 113. The flexure 111 further forms a tongue region 111a for positioning the two PZT elements 107 of the micro-actuator. Referring to FIG. 1c, when a voltage is input to the two thin film PZT elements 107 of the PZT micro-actuator, one of the PZT elements may contract as shown by arrow D while the other may expand as shown by arrow E. This will generate a rotation torque that causes the slider support 112 to rotate in the arrowed direction C and, in turn, makes the slider 103 move on the disk. In such case, the dimple 114a of the load beam 114 works with the bump 112a of the slider support 112, that is, the slider 103 together with the slider support 112 rotates against the dimple 114a, which keeps the load force from the load beam 114 evenly applying to the center of the slider 103, thus ensuring the slider 103 a good fly performance, supporting the head with a good flying stability.

However, as the slider support 112 is coupled with the metal base 113 by the traces of the flexure 111 which are only 10-20 um in thickness and formed from soft polymer material, the flexure 111 is easy to distort and accordingly the suspension 110 is likely to deform during the suspension manufacture process, HGA manufacturing process, the handle process or ultrasonic cleaning process. Such deformation also happens in case of vibration or a shock event. Moreover, the suspension deformation resulted from such weak structure will adversely cause the suspension or HGA dimple separation. FIGS. 2a and 2b respectively show a suspension tongue region deformation and a dimple separation. Besides, as the slider 103 is partially mounted on the slider support 112 and the slider support 112 is coupled with the metal base 113 via traces of the flexure 111, the static attitude of the slider 103 such as PSA (pitch static attitude) or RSA (roll static attitude) is difficult to control, which causes the HGA performance unstable and accordingly, affects the HGA dynamic performance seriously, especially when a vibration or shock event happens or during the manufacture process or handle process. Finally, such structure makes the whole HGA a poor shock performance. When a vibration or shock event happens, for example tilt drop shock or operation shock, the suspension 110 or the PZT elements 107 of the PZT micro-actuator may be caused to damage.

Hence, it is desired to provide an improved suspension, a HGA with a micro-actuator and its manufacturing method, and a disk drive unit with such HGA to solve the above-mentioned problems and achieve a good performance.

SUMMARY OF THE INVENTION

Accordingly, an object of the present invention is to provide a suspension for a HGA with improved structures capable of avoiding suspension deformation and dimple separation during manufacturing process or shock events, thus improving the shock performance as well as the static and dynamic performance of the HGA.

Another object of the present invention is to provide a HGA with a suspension which has improved structures capable of avoiding suspension deformation and dimple separation during manufacturing process or shock events, thus improving the shock performance as well as the static and dynamic performance of the HGA.

Still another object of the present invention is to provide a method for manufacturing a HGA to avoid suspension deformation and dimple separation, and to improve shock performance as well as static and dynamic performance of the HGA.

A further object of the present invention is to provide a disk drive unit having good static and dynamic performance and improved shock performance.

To achieve the above-mentioned object, the present invention provides a suspension for a HGA. The suspension comprises a flexure and an outrigger. The flexure has a tongue region and the tongue region comprises a slider setting portion for mounting a slider, and a piezoelectric element setting portion for mounting piezoelectric elements. The outrigger has a pair of rigid beams and a pair of spring beams. The pair of rigid beams are respectively coupled to the flexure at opposite sides of the tongue region. The pair of spring beams each has one end thereof connected to a free end of the corresponding rigid beam and the other end thereof extending to a middle region of the slider setting portion of the flexure so as to support the slider.

As an embodiment of the present invention, each of the spring beams comprises a plurality of bends so that a length of the spring beam is larger than a distance between the rigid beam and the middle region of the slider setting portion. Preferably, each of the spring beams is shaped as a curve. Alternatively, the spring beam may also be shaped as other shape, such as square-shape or V-shape. As another embodiment of the present invention, each of the spring beams has at least a weak point, and the width of the weak point is narrower than the width of the spring beam. Preferably, the spring beam of the outrigger has a portion coplanar with the slider setting portion of the tongue region.

As another embodiment of the present invention, the rigid beam of the outrigger has a side forming structure which has a forming angle between the rigid beam and the associated spring beam. Preferably, the rigid beam of the outrigger has a flat portion and a vertical portion which vertically bents from the flat portion. Also preferably, the rigid beam of the outrigger has a vertical structure that is perpendicular to the tongue region of the flexure.

Preferably, the rigid beam of the outrigger further has at least one window or open or partial etching recess formed in the cross edge of the vertical portion and the flat portion.

A HGA for a disk drive unit of the present invention comprises a slider, a micro-actuator and a suspension for supporting the slider and the micro-actuator. The micro-actuator includes PZT elements. The suspension comprises a flexure having a tongue region and an outrigger. The tongue region comprises a slider setting portion for mounting the slider and a PZT element setting portion for mounting the PZT elements. The outrigger has a pair of rigid beams and a pair of spring beams. The pair of rigid beams are respectively coupled to the flexure at opposite sides of the tongue region. The pair of spring beams each has one end thereof connected to a free end of the corresponding rigid beam and the other end thereof extending to a middle region of the slider setting portion of the flexure so as to support the slider.

A method for manufacturing a HGA of the present invention comprises steps of: (1) forming a flexure and an outrigger, the flexure having a tongue region that comprises a slider setting portion and a PZT element setting portion, the outrigger having a pair of rigid beams and a pair of spring beams, the pair of rigid beams respectively coupling the flexure at opposite sides of the tongue region, the pair of spring beams each having one end thereof connecting to a free end of the corresponding rigid beam and the other end thereof connecting to a middle region of the slider setting portion; (2) providing PZT elements and mounting the PZT elements to the PZT element setting portion of the flexure; and (3) providing a slider and mounting the slider to the slider setting portion of the flexure.

A disk drive unit of the present invention comprises a HGA, a drive arm to connect the HGA, a disk and a spindle motor to spin the disk. The HGA comprises a slider, a micro-actuator and a suspension for supporting the slider and the micro-actuator. The micro-actuator includes PZT elements. The suspension comprises a flexure having a tongue region and an outrigger. The tongue region comprises a slider setting portion for mounting the slider and a PZT element setting portion for mounting the PZT elements. The outrigger has a pair of rigid beams and a pair of spring beams. The pair of rigid beams are respectively coupled to the flexure at opposite sides of the tongue region. The pair of spring beams each has one end thereof connected to a free end of the corresponding rigid beam and the other end thereof extending to a middle region of the slider setting portion so as to support the slider.

In comparison with the prior art, the pair of spring beams enable the flexure to possess enough flexibility and sound spring rate in X-Y plane (parallel to the plan of the flexure), which assists the slider to have enough displacement when the micro-actuator is excited, so the slider can rotate freely. Also, the pair of rigid beams provide the flexure enough stiffness in Z-axis direction (vertical to the plan of the flexure), which successfully prevents the flexure distortion and assists the HGA with the flexure to avoid suspension deformation as well as dimple separation during manufacturing process or handle process or in vibration or shock events and thus improves shock performance of HGA. Also, the structure of the suspension mentioned above enables the HGA to have a good static performance, such as a favorable capability of PSA/RSA control, which accordingly, improves dynamic performance of the HGA during the slider flying on the disk.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 1b is an exploded, perspective view of a conventional HGA used in the disk drive unit of FIG. 1a;

FIG. 3b is an exploded, perspective view of the HGA shown in FIG. 3a;

FIG. 4b is a perspective view of the flexure of the HGA shown in FIG. 4a;

FIG. 4c is a perspective view of PZT elements of the PZT micro-actuator of the HGA shown in FIG. 4a;

FIG. 4d is a partial side elevational view of the HGA of FIG. 4a;

DETAILED DESCRIPTION OF ILLUSTRATED EMBODIMENTS

Figure 1A:
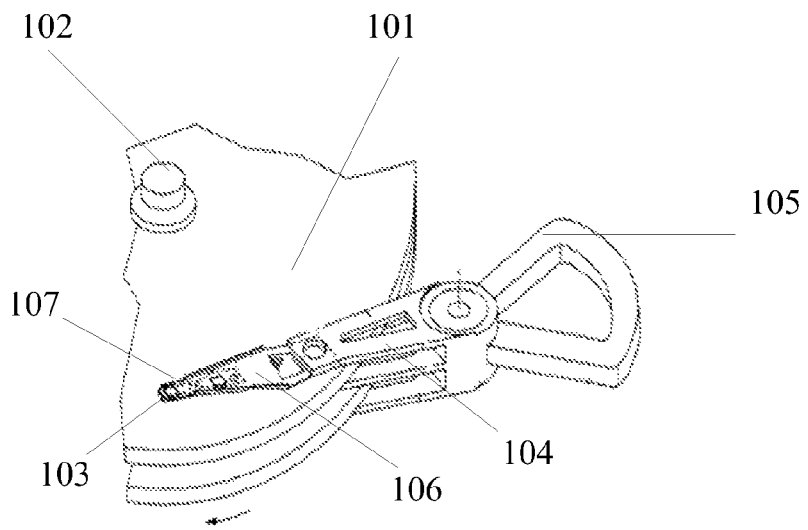
FIG. 1a is a perspective view of a conventional disk drive unit.
Figure 1B:
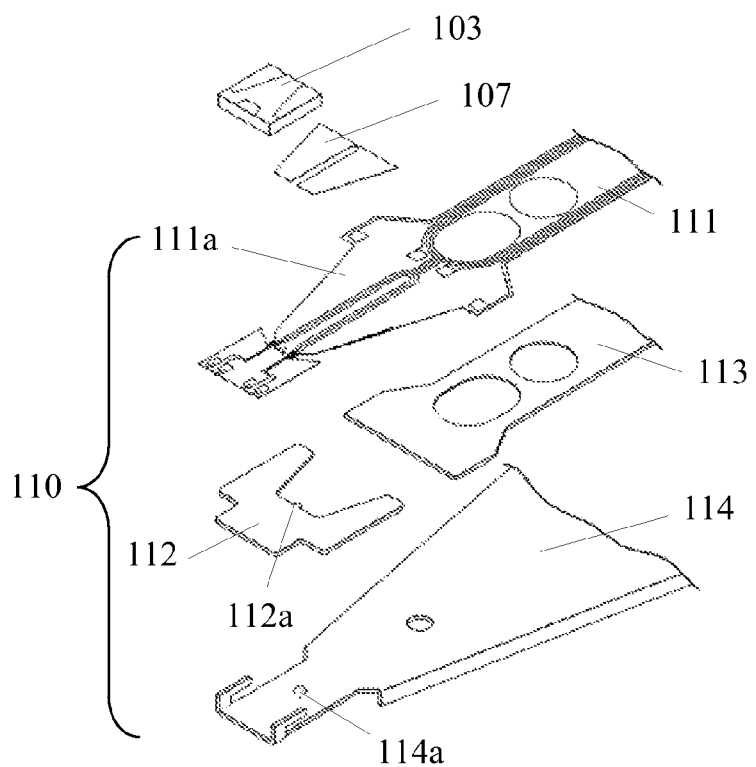
Figure 1C:
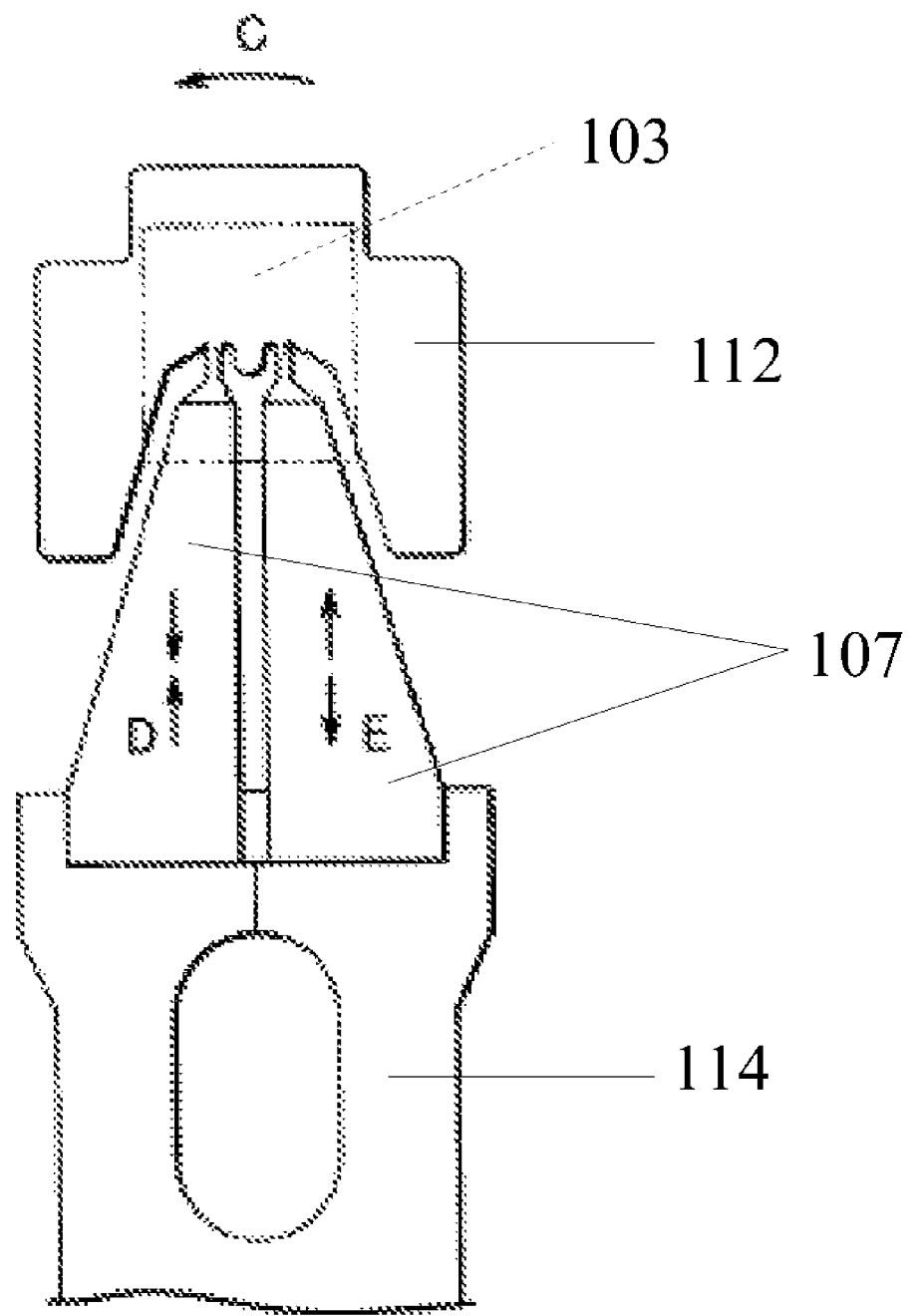
FIG. 1c is a partial top plan view of the assembled HGA shown in FIG. 1b, illustrating the operating principles of the associated HGA.
Figure 2A:
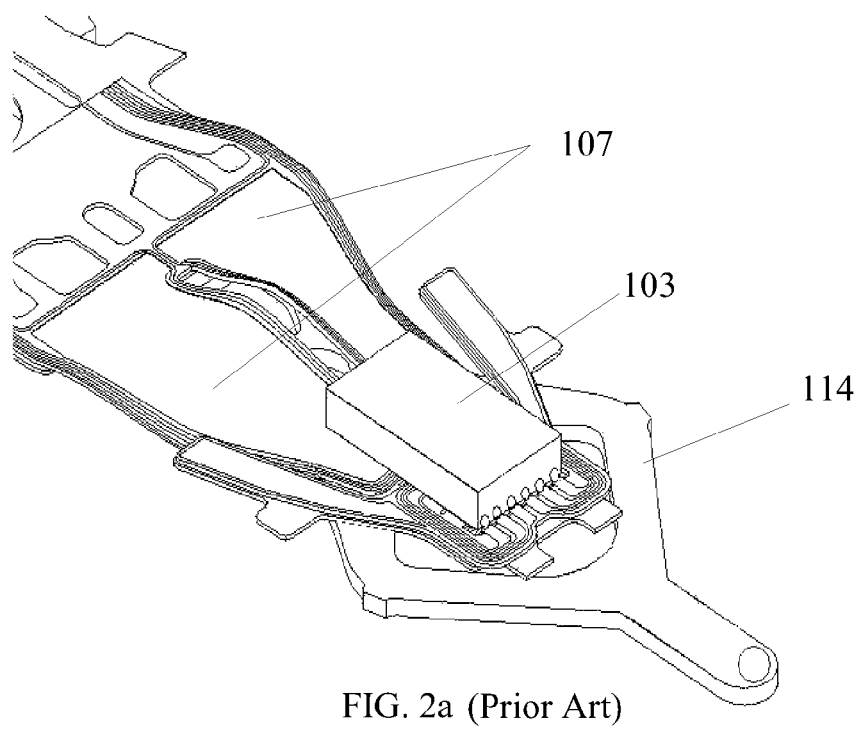
FIG. 2a is a diagrammatic view illustrating a suspension tongue region deformation problem of the conventional HGA.
Figure 2B:
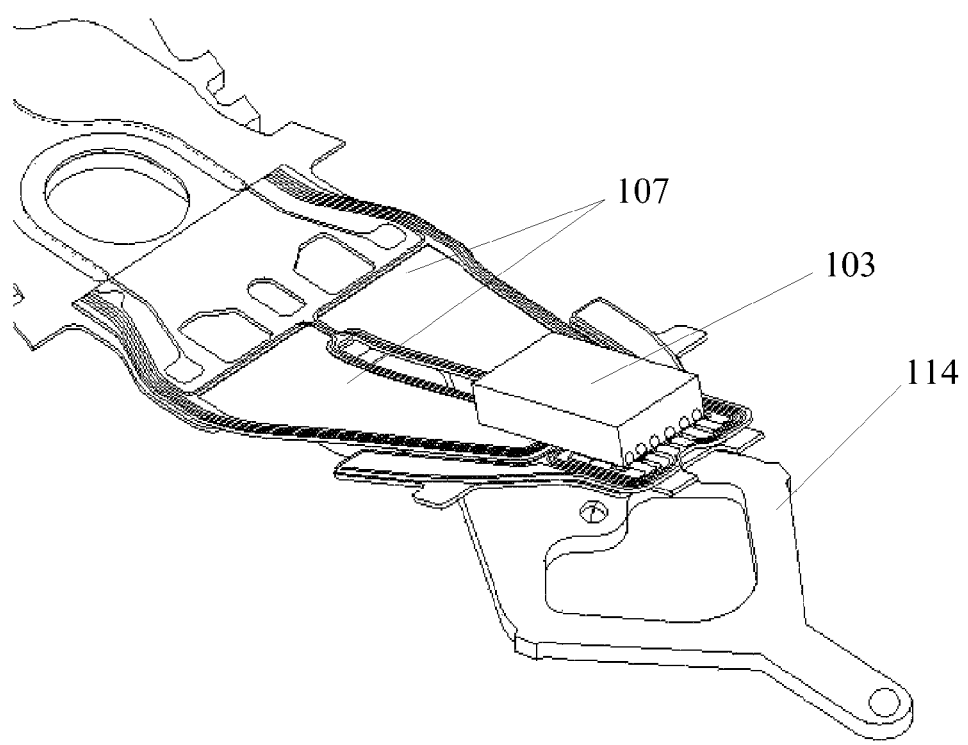
FIG. 2b is a diagrammatic view illustrating a dimple separation problem of the conventional HGA.

Various preferred embodiments of the invention will now be described with reference to the figures, wherein like reference numerals designate similar parts throughout the various views. As indicated above, the invention is directed to a suspension for suspending a slider that performs at least one of a recording and a reproduction of information with respect to a recording medium. The suspension comprises a flexure having a tongue region and an outrigger. The outrigger has a pair of rigid beams and a pair of spring beams. The pair of rigid beams are respectively coupled to the flexure at opposite sides of the tongue region. The pair of spring beams each has one end thereof connected to a free end of the corresponding rigid beam and the other end thereof extending to a middle region of a slider setting portion of the flexure so as to support the slider. The configuration of the outrigger introduced in the suspension enables the flexure to possess sound spring rate in X-Y plane as well as favorable stiffness in Z-axis direction, thus not only providing the flexure a good flexibility and the slider desirable displacement but also assisting a HGA with the suspension to successfully avoid suspension deformation and dimple separation. Furthermore, suspension with the outrigger mentioned above enables the HGA to have a good static performance, such as a favorable capability of PSA/RSA control, which accordingly, improves dynamic performance of the HGA during the slider flying on the disk.

Figure 3A:
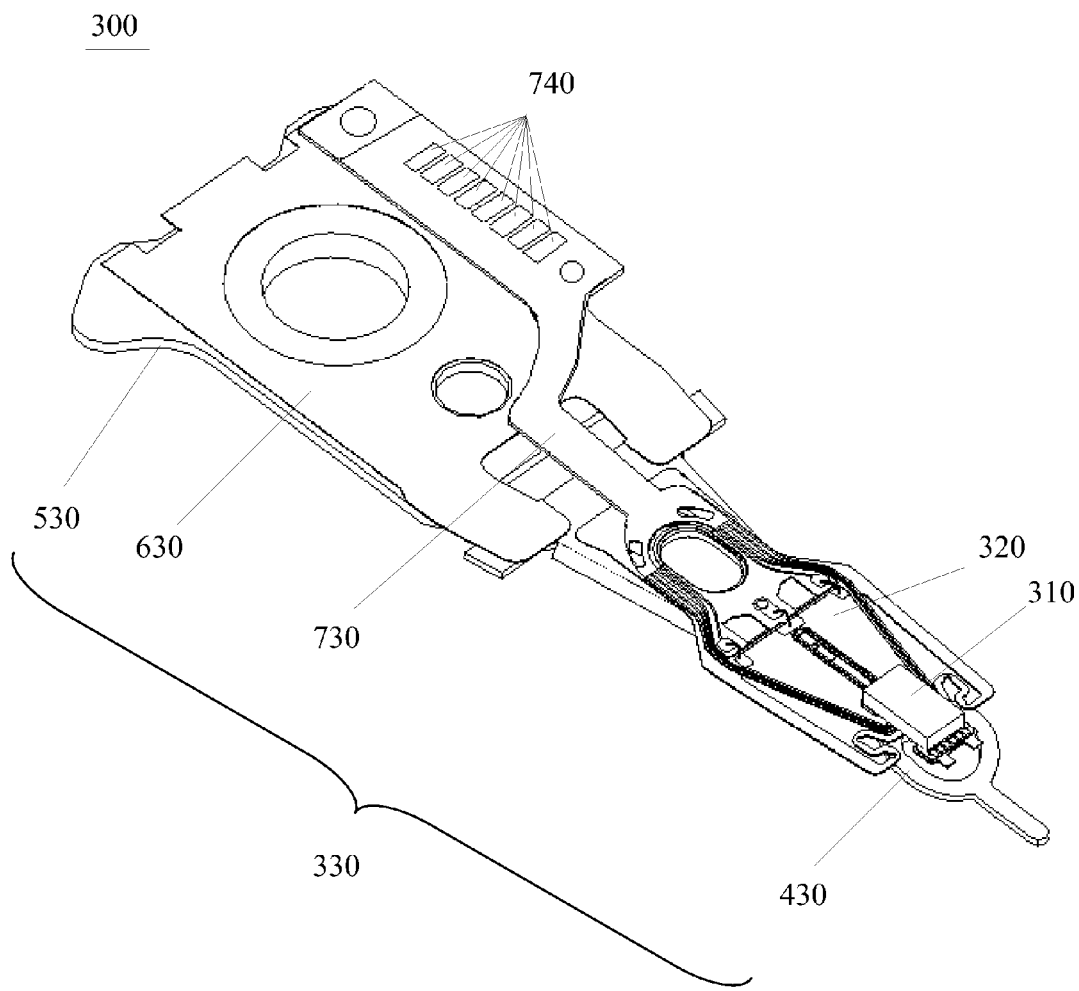
FIG. 3a is a perspective view of a HGA with a PZT micro-actuator according to a first embodiment of the present invention, a flexure of the HGA forming an outrigger with a pair of rigid beams of side forming structure and a pair of spring beams shaped as a curve.
Figure 3B:
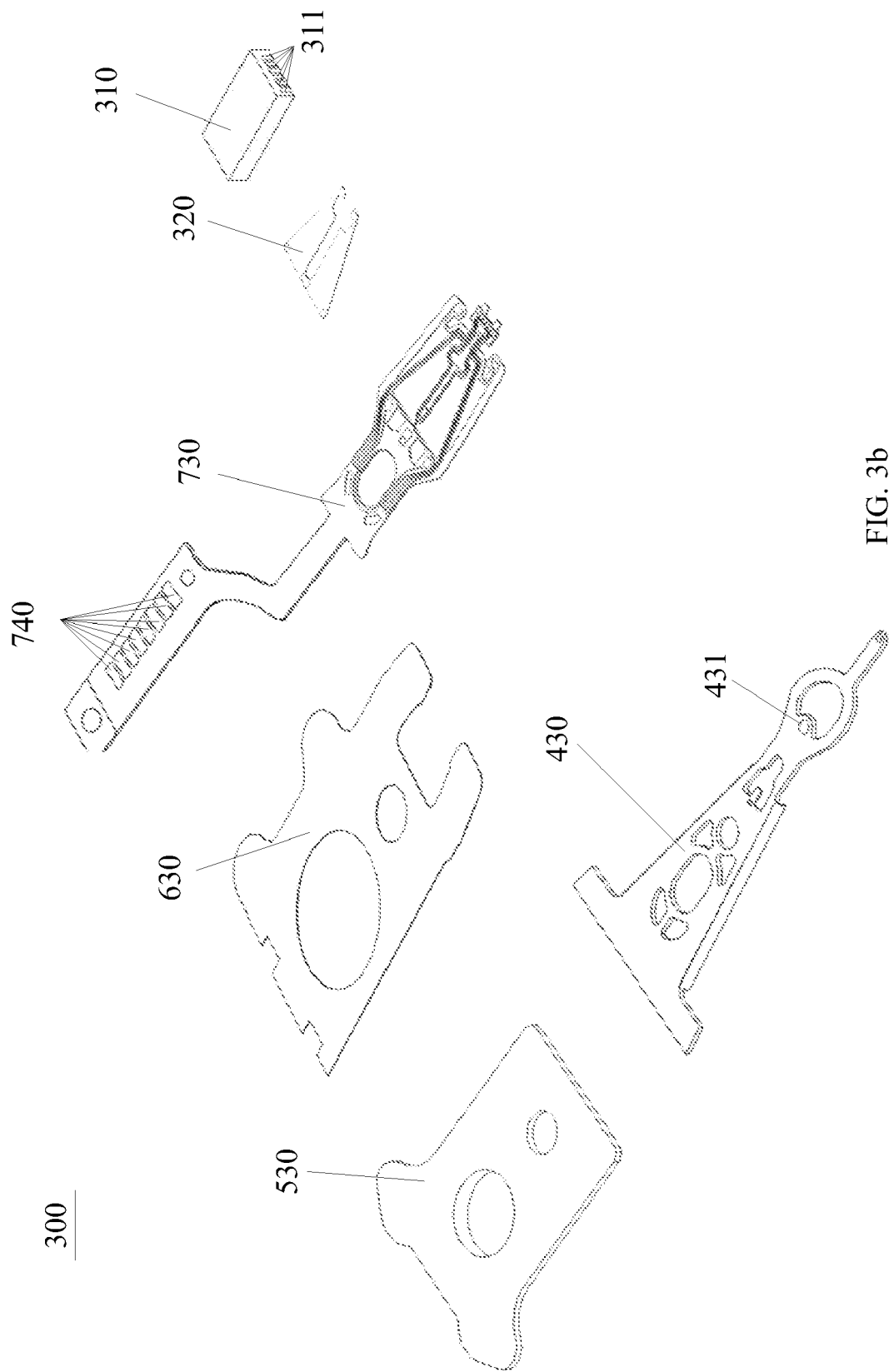

FIGS. 3a-5b illustrates a first embodiment of the HGA 300 according to the present invention. Referring to FIGS. 3a and 3b, the HGA 300 generally comprises a slider 310 with a plurality of slider electrical pads 311, two PZT elements 320 of a micro-actuator, and a suspension 330 to load or support the slider 310 and the PZT elements 320. The suspension 330 includes a load beam 430, a base plate 530, a hinge 630, and a flexure 730, all of which are assembled together. The load beam 430 is connected to the base plate 530 by the hinge 630, and the flexure 730 runs from the hinge 630 to the load beam 430. One end of the load beam 430 is coupled to the base plate 530 which is swaged to the drive arm (not shown), and the other end of the load beam 430 supports the tongue region of the flexure 730. The tongue region of the flexure 730 provides flexibility for the slider 310. Specifically, the flexure 730 provides a plurality of suspension pads 740 which are connected to a control system. In order to smoothly and evenly transfer the load force from the load beam 430 to the slider 310, the load beam 430 provides a main dimple 431 to support the tongue region of the flexure 730 at a position where the slider 310 is mounted.

Figure 4A:
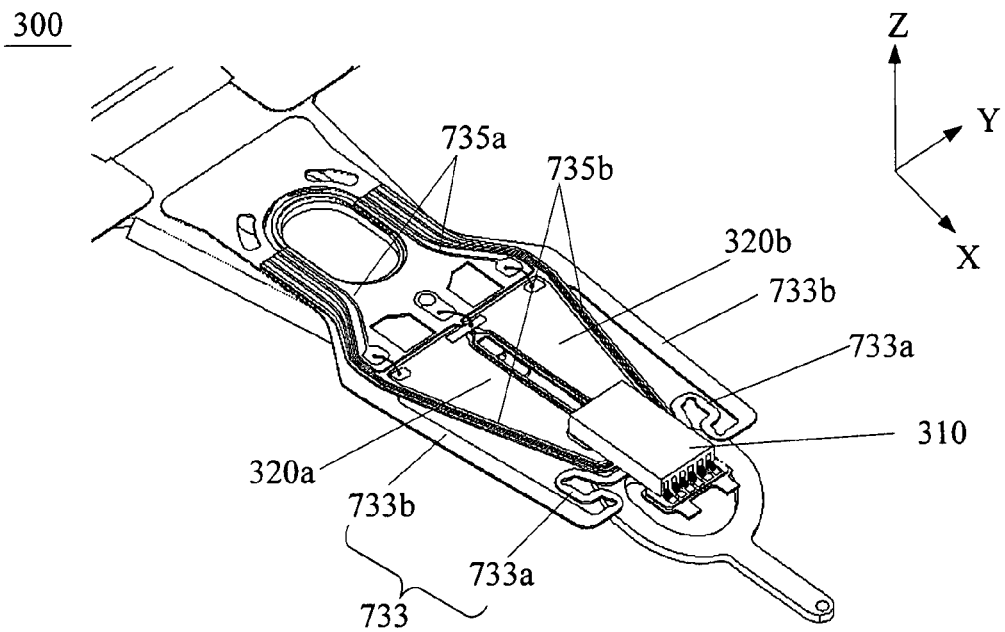
FIG. 4a is a partially enlarged perspective view of the HGA of FIG. 3a, showing a tongue region of the HGA.
Figure 4B:
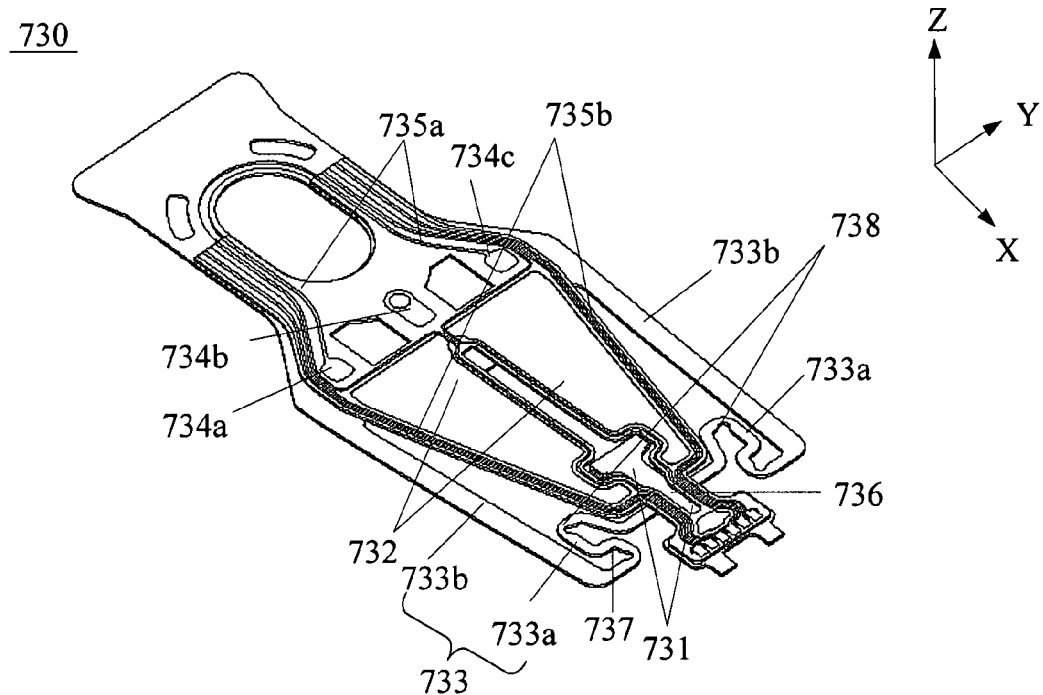
Figure 4C:
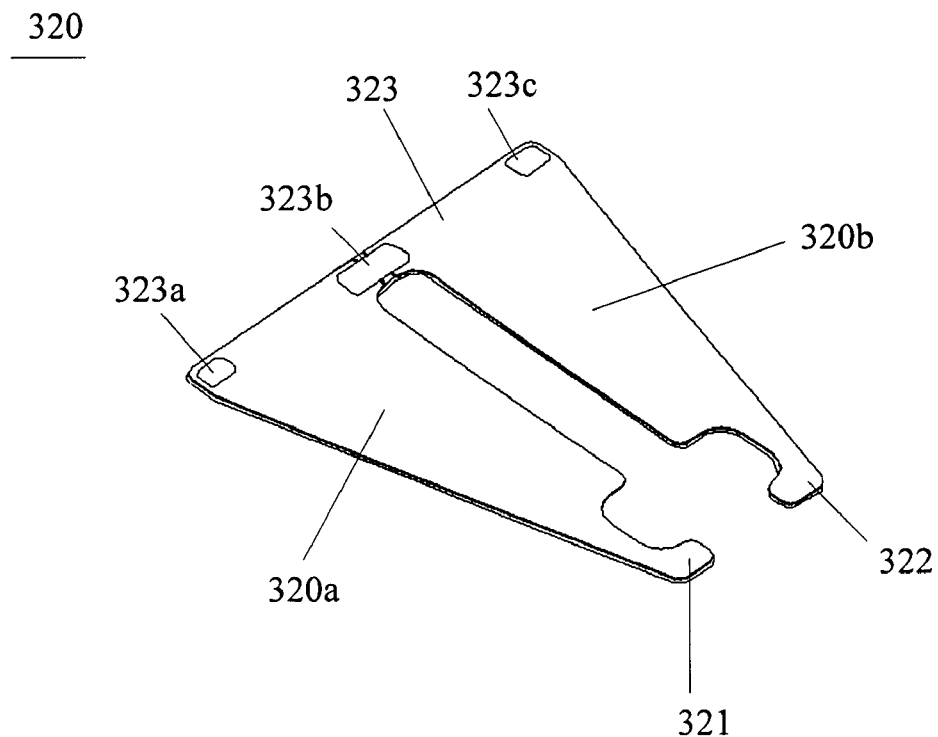

FIG. 4a shows a tongue region of the HGA 300 in great detail. FIG. 4b and FIG. 4c respectively show the flexure 730 and the PZT elements 320 of the micro-actuator of the HGA 300.

As shown in FIG. 4b, the flexure 730 has a tongue region and the tongue region comprises a slider setting portion 731 for mounting the slider 310 and a PZT element setting portion 732 for mounting the PZT elements 320. In addition, the flexure 730 forms an outrigger 733. Specifically, the outrigger 733 has a pair of rigid beams 733b and a pair of spring beams 733a. The pair of rigid beams 733b are respectively coupled to the flexure 730 at opposite sides of the tongue region. The pair of spring beams 733a each has one end thereof connected to a free end of the corresponding rigid beam 733b and the other end thereof extending to a middle region 736 of the slider setting portion 731 of the flexure 730 so as to support the slider 310.

In the subject embodiment, the spring beams 733a enable the flexure 730 to possess sound spring rate in X-Y plane and the rigid beams enable the flexure 730 to possess sound stiffness in Z-axis direction, which assists the HGA 300 to avoid suspension tongue region deformation and dimple separation during manufacturing process or in vibration or shock events, thereby improving shock performance of the HGA 300. In addition, the configuration of the outrigger 733 assists the HGA 300 to maintain a good flexibility, thus the slider 310 has enough displacement when operating the PZT micro-actuator 320 and the slider 310 can rotate freely. Furthermore, as the flexure 730 maintains enough stiffness in Z-axis direction, that is, both pitch and roll direction, the slider 310 has a good static performance as providing a favorable capability of PSA/RSA control, which accordingly, improves dynamic performance of the HGA 300 during the slider 300 flying on the disk.

As best shown in FIG. 4b, each of the spring beams 733a comprises a plurality of bends 737 so that a length of the spring beam 733a is larger than a distance between the rigid beam 733a and the middle region 736 of the slider setting portion 731. Therefore, the outrigger 733 processes substantial stretchable capability and can extend in a much broader range as well as reduce gimbal stiffness of the HGA 300 in pitch and roll direction. Thus the flexure 730 with the outrigger 733 could provide an advantageous flexibility and lower gimbal stiffness, assisting the slider 310 to have enough displacement when the PZT elements 320 of the micro-actuator are excited, and so the slider 310 can rotate freely. Preferably, each of the spring beams 733a is shaped as a curve. It will be appreciated that, alternatively, the spring beams 733a can also be shaped as other shape, such as square-shape, V-shape or other possible shape so long as it can increase the flexibility of the spring beams 733a and increase the displacement of the slider 310 when operation the micro-actuator. Preferably, the spring beam 733a of the outrigger 733 has a portion coplanar with the slider setting portion 731 of the tongue region of the flexure 730. In another embodiment of this invention, the spring beams 733a comprises at least one weak point 738, and the width of the weak point 738 is narrower than the width of the spring beams 733a. The introduction of the weak point 738 also helps to increase the flexibility of the spring beams 733a and to further reduce gimbal stiffness of the HGA 300. When the HGA 300 is designed to possess the above-mentioned features, the flying stability and static and dynamic performance of the slider 310 will also be optimized.

According to the first embodiment shown in FIG. 4b, the flexure 730 further has a plurality of flexure electrical pads 734a, 734b, 734c and two sets of electrical traces 735a, 735b in the tongue region. Referring to FIG. 4c, the PZT elements 320 of the micro-actuator comprise PZT elements 320a, 320b. The PZT elements 320a, 320b have a free end 321, 322 respectively and a common end 323, which comprises a plurality of PZT electrical pads 323a, 323b, 323c thereon corresponding to the flexure electrical pads 734a, 734b, 734c, wherein the PZT electrical pad 323b is a common ground. Turning now to FIGS. 4a and 4b, the slider 310 is partially mounted in such a way as the slider setting portion 731 of the flexure 730 supporting the slider 310 and the spring beams 733a partially supporting the slider 310. The two PZT elements 320a, 320b of the PZT micro-actuator are respectively arranged at the PZT element setting portion 732 of the flexure 730. Some electrical bonding methods, such as soldering or wire bonding or other suitable method, are used for electrical connection between the flexure 730 and the PZT elements 320a, 320b. One end of trace 735a, 735b formed on the flexure 730 connects with the PZT electrical pads 323a, 323b, 323c of the PZT elements 320a, 320b and the slider electrical pads 311 of the slider 310, and the other end connects with the control system through the suspension pads 731 (shown in FIG. 3b). Thus the control system can respectively control the slider 310 and the PZT micro-actuator via traces 735a, 735b.

Figure 4D:
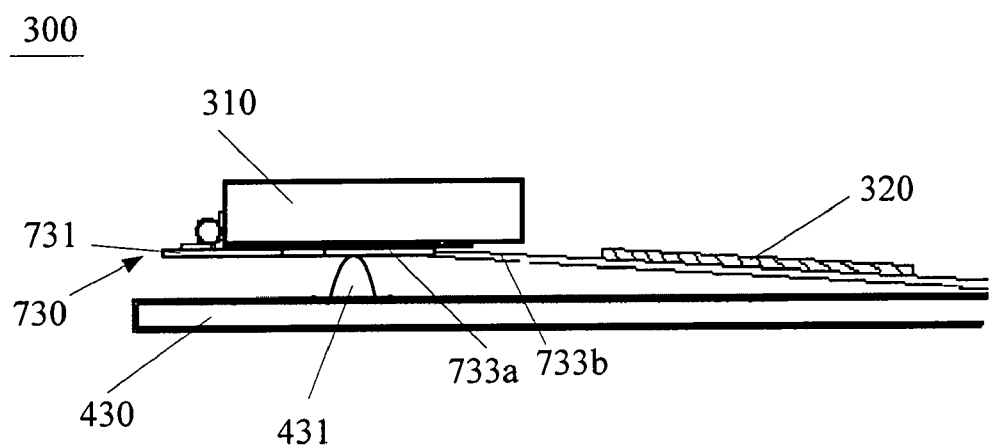

FIG. 4d is a partial side elevational view of the HGA 300 of FIG. 4a. The slider 310 is partially mounted on the slider setting portion 731 of the tongue region of the flexure 730 with the spring beams 733a supporting the middle region 736 of the slider setting porting 731 and the rigid beams 733b stiffing the flexure 730. As shown in FIG. 4d, the PZT elements 320 of the micro-actuator are arranged on the flexure 730 and the main dimple 431 of the load beam 430 supports the flexure 730. When the slider 310 is flying on the disk (not shown), the main dimple 431 keeps the load force from the load beam 430 always evenly applying to the center of the slider 310, thus ensuring the slider 310 a good fly performance.

Figure 5A:
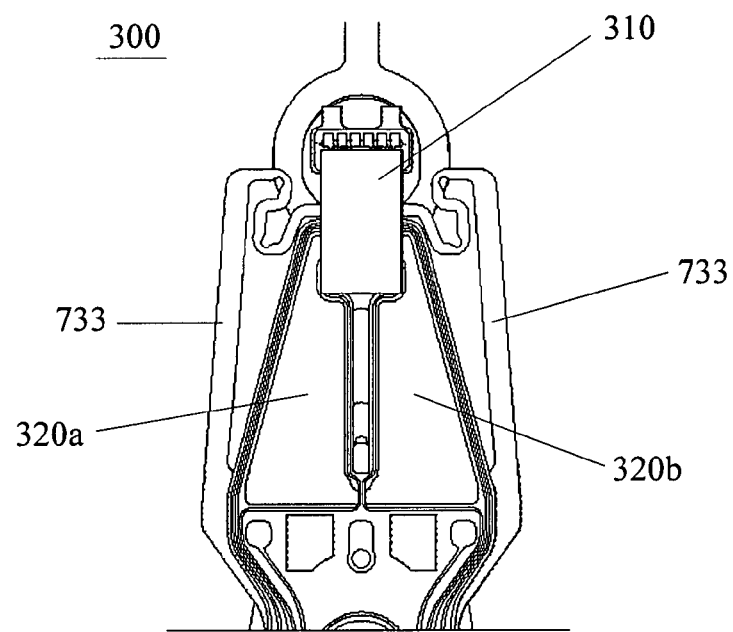
FIG. 5a is a top plan view of the HGA shown in FIG. 4a, in which the PZT micro-actuator is not excited.
Figure 5B:
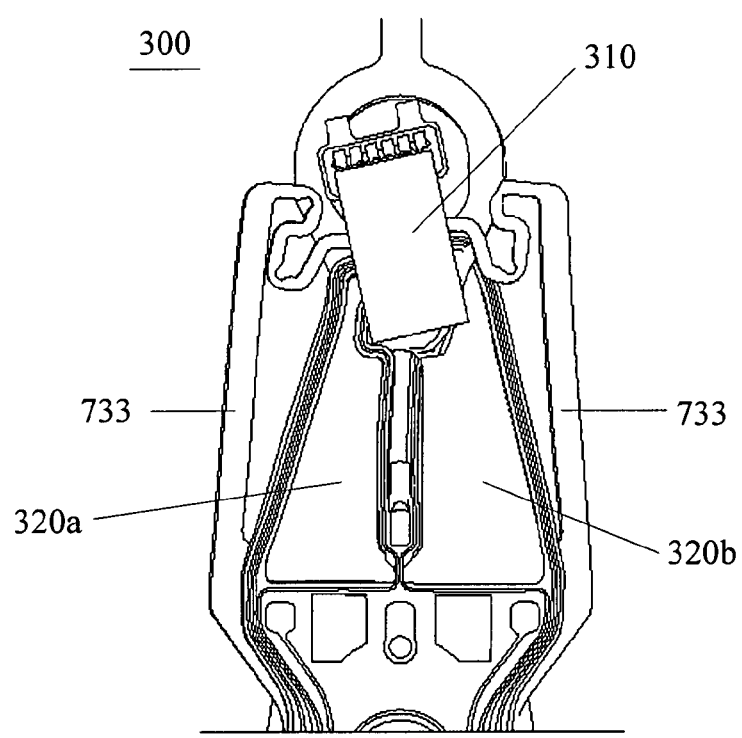
FIG. 5b is a top plan view of the HGA shown in FIG. 4a, showing how the PZT micro-actuator works when a voltage is input thereto.

FIG. 5a is a top plan view of the HGA 300 shown in FIG. 4a, in which the PZT elements 320 of the micro-actuator are not excited. FIG. 5b is a top plan view of the HGA 300 shown in FIG. 4a, showing how PZT elements 320 of the micro-actuator 320 work when a voltage is input thereto. Detailedly, when a voltage is injected into the PZT elements 320a, 320b of the PZT micro-actuator, one PZT element 320a contracts and the other PZT element 320b extends, which generates a rotation torque to cause the tongue region of the flexure 730 to rotate against the main dimple 431 of the load beam 430. Because the slider 310 is partially supported by the spring beams 733a of the outrigger 733 in the middle region 736 of the slider setting porting 731 of the flexure 730, and because the spring beams 733a maintains the outrigger 733 in the top end and provides the tongue region with enough spring space for rotation, the slider 310 can achieve a favorable and sound displacement.

Figure 6:
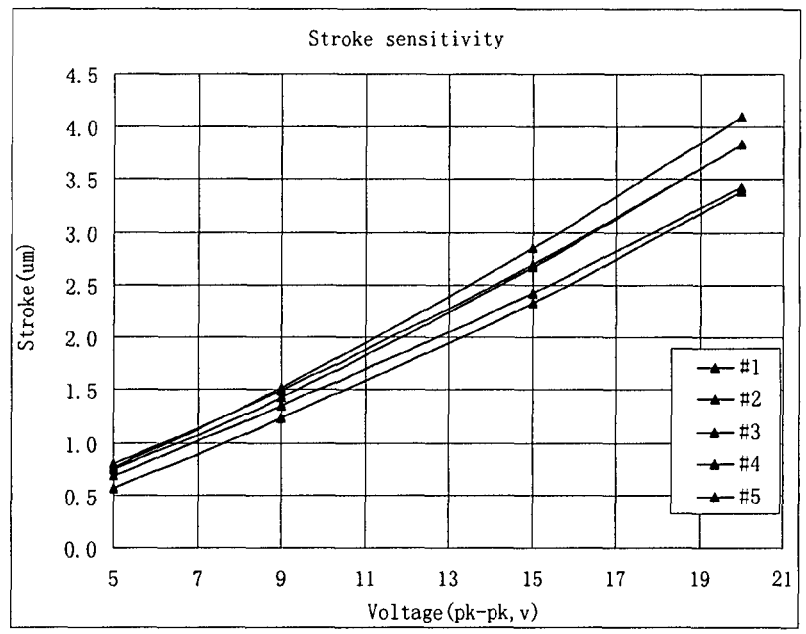
FIG. 6 shows testing data of the stroke sensitivity of the micro-actuator in the present invention.
Figure 7:
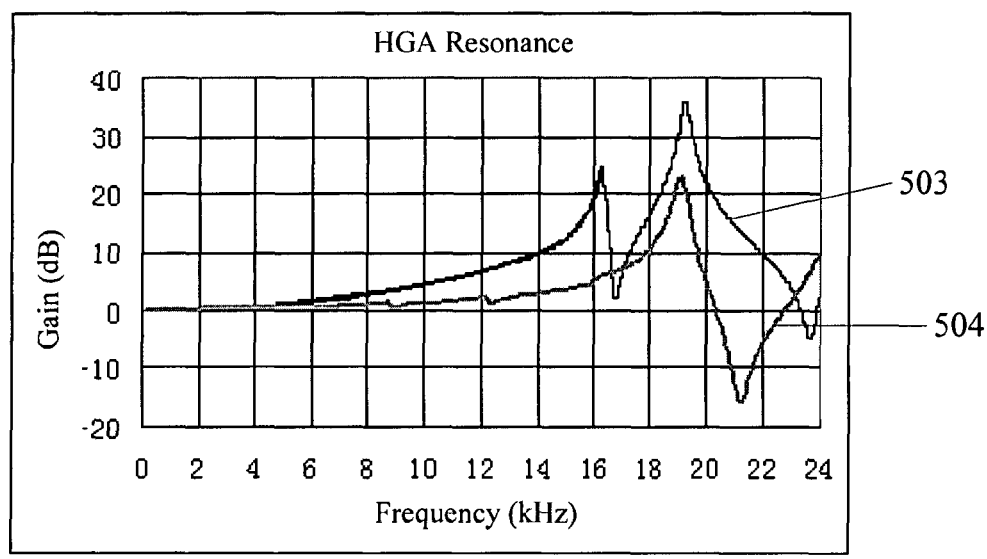
FIG. 7 shows testing data of the resonance gain of the micro-actuator in the present invention.

FIG. 6 and FIG. 7 illustrate testing data of the HGA 300 of the present invention. FIG. 6 shows testing data of the stroke sensitivity of the micro-actuator in the present invention. As shown in FIG. 6a, the stroke sensitivity is around 170 nm per voltage. This indicates that the HGA 300 with the micro-actuator according to the present invention is eligible to be applied to disk drive unit. FIG. 6b shows testing data of the resonance gain of the micro-actuator in the present invention. The curve 503 illustrates the resonance gain when the base plate 530 is shaken or excited, and the curve 504 shows the resonance gain when the PZT elements 320a, 320b are excited. We can see the advantage of this invention is that the suspension resonance (for example the torsion, the sway and bending mode) is never be excited when operating the micro-actuator. Thus, the performance characteristics of the disk drive unit, for example, the servo bandwidth, is significant improved.

Figure 8A:
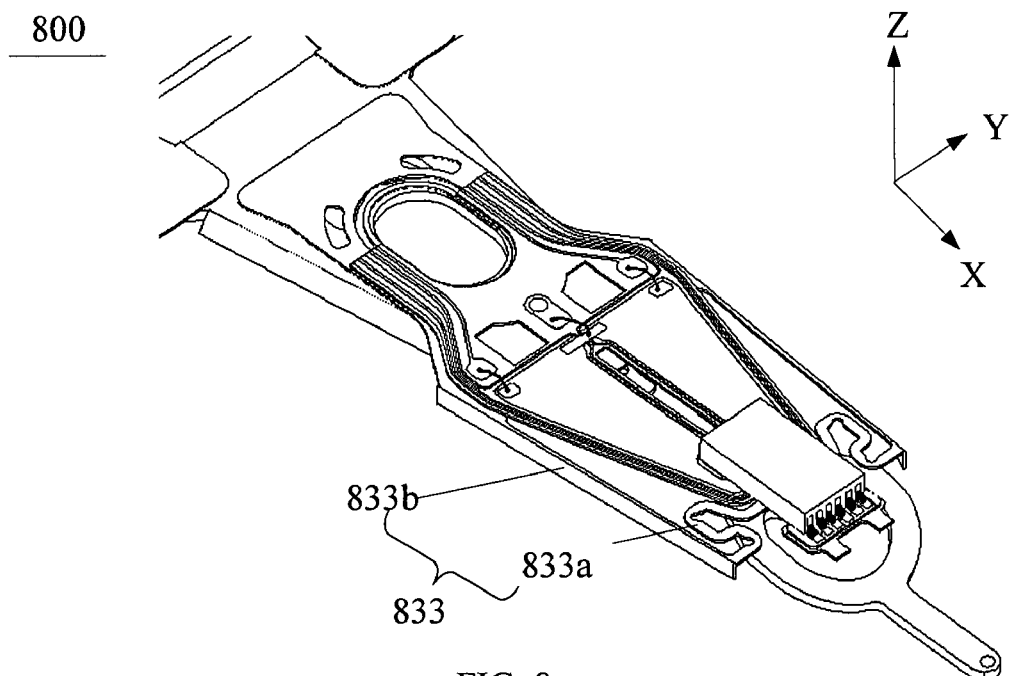
FIG. 8a is a partially enlarged perspective view of the HGA with a PZT micro-actuator according to a second embodiment of the present invention, a flexure of the HGA forming an outrigger with a pair of rigid beams having a vertical portion perpendicular to the tongue region of the flexure and a pair of spring beams shaped as a curve.

FIG. 8a is a partially enlarged perspective view of the HGA 800 with a PZT micro-actuator according to a second embodiment of the present invention. Comparing with the HGA 300 of the first embodiment shown in FIG. 4a, the HGA 800 has an outrigger 833 at the two opposite sides of the tongue region thereof that is different from the outrigger 733 of the HGA 300. The outrigger 833 has a pair of rigid beams 833b and a pair of the spring beams 833a. The rigid beams 833b may be side-formed from the flexure in its tongue region. The rigid beam 833b of the outrigger 833 has a side forming structure which has a forming angle between the rigid beam 833b and the associated spring beam 833a. In the subject embodiment, the forming angle is 90 degree, that is, the rigid beam 833b has a vertical structure which is perpendicular to the tongue region of the flexure. The pair of spring beams 833a is the same as that of the out trigger 733. This configuration of the outrigger 833 also can provide a favorable flexibility in X-Y plane and maintain a further improved stiffness in Z-axis.

Figure 8B:
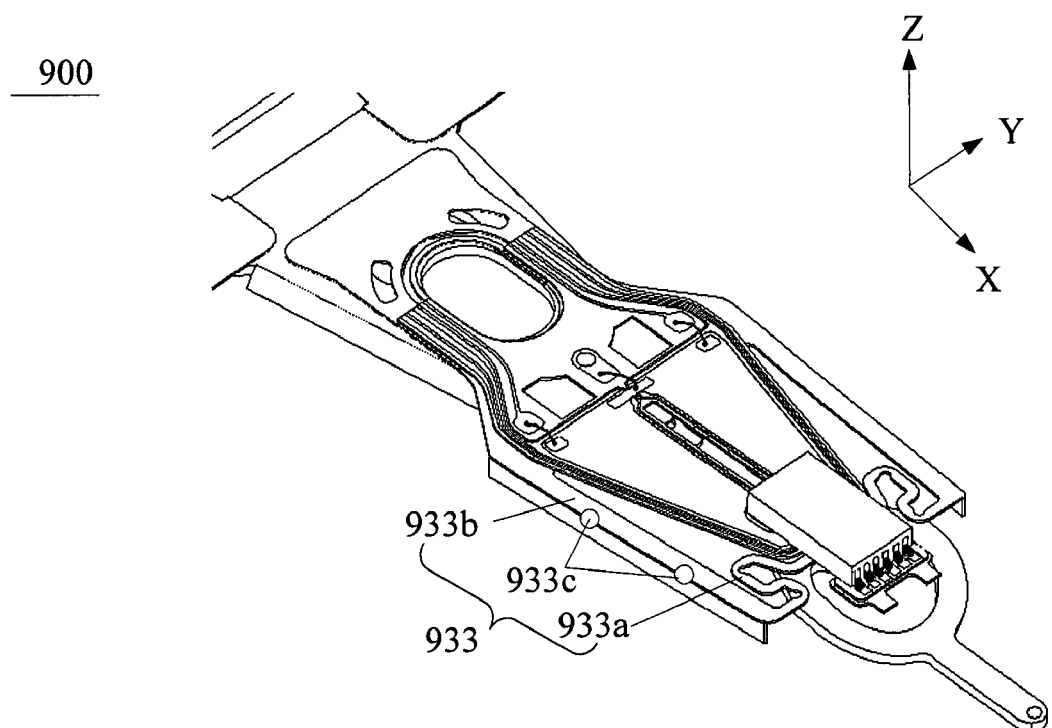
FIG. 8b is a partially enlarged perspective view of the HGA with a PZT micro-actuator according to a third embodiment of the present invention, a flexure of the HGA forming an outrigger with a pair of rigid beams having a vertical structure bent vertically therefrom and a pair of spring beams shaped as a curve.

FIG. 8b is a partially enlarged perspective view of the HGA 900 with a PZT micro-actuator according to a third embodiment of the present invention. Comparing with the HGA 300 of the first embodiment shown in FIG. 4a, the HGA 900 has an outrigger 933 at the two opposite sides of the tongue region thereof that is different from the outrigger 733 of the HGA 300. The outrigger 933 has a pair of rigid beams 933b which has a vertical portion and a flat portion. The vertical portion is bent vertically from the flat portion and is perpendicular to the tongue region of the flexure. The pair of spring beams 933a is the same as that of the outrigger 733. This configuration of the outrigger 933 also can provide a favorable flexibility in X-Y plane and maintains a further improved stiffness in Z-axis. In one of the embodiment of the present invention, the rigid beam 933b comprises at least one window or open or partial etching recess 933c formed in the cross edge of the vertical portion and flat portion. The recess 933c is processed by chemical etching. Such structure makes the side forming process easy and reduces the gimbal stiffness of the HGA 900 in both pitch and roll direction.

Figure 9:
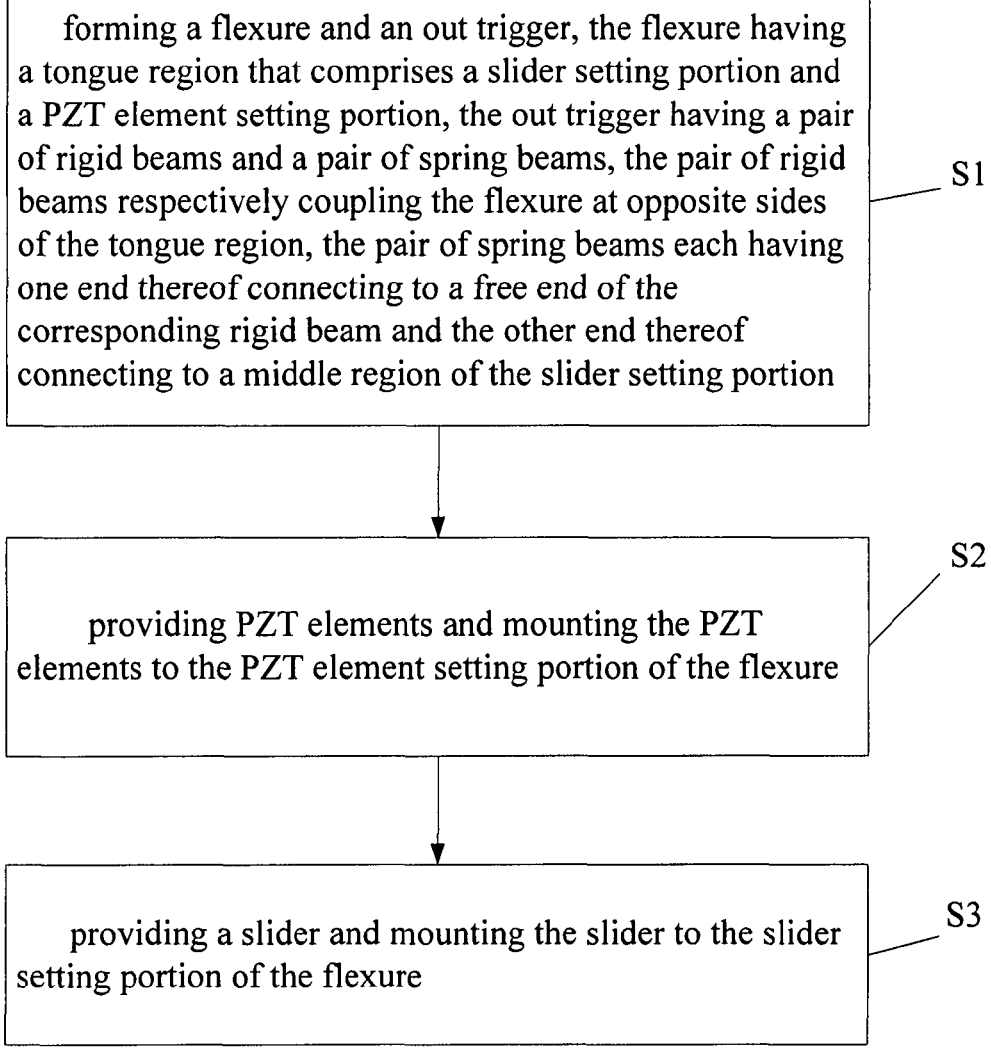
FIG. 9 is a flow chart illustrating a manufacturing method of the HGA according to an embodiment of the present invention.

FIG. 9 is a flow chart illustrating a manufacturing method of the HGA according to an embodiment of the present invention. The method comprises the steps of: (1) forming a flexure and an outrigger, the flexure having a tongue region that comprises a slider setting portion and a PZT element setting portion, the outrigger having a pair of rigid beams and a pair of spring beams, the pair of rigid beams respectively coupling the flexure at opposite sides of the tongue region, the pair of spring beams each having one end thereof connecting to a free end of the corresponding rigid beam and the other end thereof connecting to a middle region of the slider setting portion (step S1); (2) providing PZT elements and mounting the PZT elements to the PZT element setting portion of the flexure (step S2); (3) providing a slider and mounting the slider to the slider setting portion of the flexure (step S3).

Figure 10:
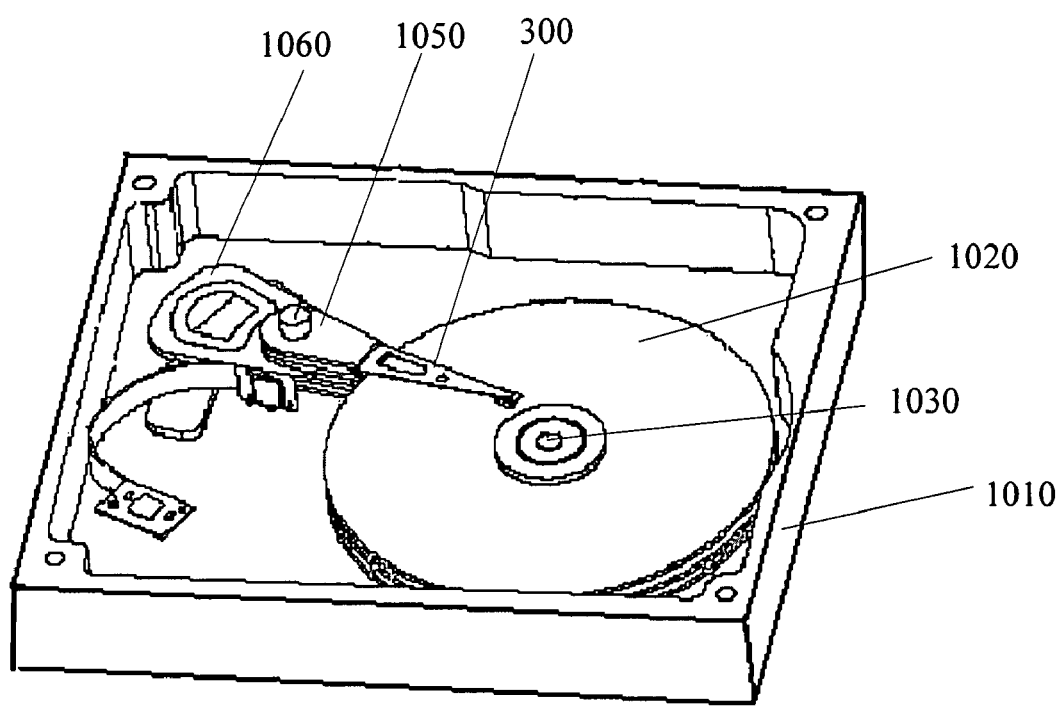
FIG. 10 is a perspective view of a disk drive unit according to the present invention.

Referring to FIG. 10, according to an embodiment of the present invention, a disk drive unit can be attained by assembling a base 1010, a disk 1020, a spindle motor 1030 for spinning the disk 1020, a VCM 1060, and a drive arm 1050 with the HGA 300, 800 or 900. Because the structure and/or assembly process of the disk drive unit of the present invention are well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A suspension for a head gimbal assembly comprising:
 a flexure having a tongue region, the tongue region comprising a slider setting portion for mounting a slider, and a piezoelectric element setting portion for mounting piezoelectric elements; and
 an outrigger having a pair of rigid beams and a pair of spring beams, the pair of rigid beams respectively coupling the flexure at opposite sides of the tongue region, the pair of spring beams each having one end thereof connected to a free end of the corresponding rigid beam and the other end thereof extending to a middle region of the slider setting portion of the flexure so as to support the slider;
 wherein each spring beam comprises a plurality of bends so that a length of the spring beam is larger than a distance between the rigid beam and the slider setting portion, the bends being formed in a common plane.

2. The suspension according to claim 1, wherein each of the spring beams is curve-shaped, square-shaped, or V-shaped.

3. The suspension according to claim 1, wherein each of the spring beams has at least one weak point, and the width of the weak point is narrower than the width of the spring beam.

4. The suspension according to claim 1, wherein the spring beam of the outrigger has a portion coplanar with the slider setting portion of the tongue region.

5. The suspension according to claim 1, wherein the rigid beam of the out trigger has a side forming structure which has a forming angle between the rigid beam and the associated spring beam.

6. The suspension according to claim 1, wherein the rigid beam of the out trigger has a flat portion and a vertical portion bent vertically from the flat portion, and the vertical portion is perpendicular to the tongue region of the flexure.

7. The suspension according to claim 1, wherein the rigid beam of the out trigger has a vertical structure which is perpendicular to the tongue region of the flexure.

8. The suspension according to claim 6, wherein the rigid beam of the out trigger further has at least one window or open or partial etching recess formed in the cross edge of the vertical portion and the flat portion.

9. A head gimbal assembly for a disk drive unit, comprising:
 a slider;
 a micro-actuator having piezoelectric elements; and
 a suspension for supporting the slider and the micro-actuator, the suspension comprising a flexure having a tongue region and an outrigger, the tongue region comprising a slider setting portion for mounting the slider, and a piezoelectric element setting portion for mounting the piezoelectric elements, the outrigger having a pair of rigid beams and a pair of spring beams, the pair of rigid beams respectively coupling the flexure at opposite sides of the tongue region, the pair of spring beams each having one end thereof connected to a free end of the corresponding rigid beam and the other end thereof extending to a middle region of the slider setting portion of the flexure so as to support the slider;
 wherein the spring beams comprises a plurality of bends so that a length of the spring beam is larger than a distance between the rigid beam and the slider setting portion, the bends being formed in a common plane.

10. The head gimbal assembly according to claim 9, wherein each of the spring beams is curve-shaped, square-shaped, or V-shaped.

11. The head gimbal assembly according to claim 9, wherein each of the spring beams has at least one weak point, and the width of the weak point is narrower than the width of the spring beam.

12. The head gimbal assembly according to claim 9, wherein the spring beam of the outrigger has a portion coplanar with the slider setting portion of the tongue region.

13. The head gimbal assembly according to claim 9, wherein the rigid beam of the out trigger has a side forming structure which has a forming angle between the rigid beam and the associated spring beam.

14. The head gimbal assembly according to claim 9, wherein the rigid beam of the out trigger has a flat portion and a vertical portion bent vertically from the flat portion, and the vertical portion is perpendicular to the tongue region of the flexure.

15. The head gimbal assembly according to claim 9, wherein the rigid beam of the out trigger has a vertical structure which is perpendicular to the tongue region of the flexure.

16. The head gimbal assembly according to claim 14, wherein the rigid beam of the out trigger further has at least one window or open or partial etching recess formed in the cross edge of the vertical portion and the flat portion.

17. A method for manufacturing a head gimbal assembly comprising steps of:
 forming a flexure and an outrigger, the flexure having a tongue region that comprises a slider setting portion and a piezoelectric element setting portion, the outrigger having a pair of rigid beams and a pair of spring beams, the pair of rigid beams respectively coupling the flexure at opposite sides of the tongue region, the pair of spring beams each having one end thereof connecting to a free end of the corresponding rigid beam and the other end thereof connecting to a middle region of the slider setting portion; wherein each spring beam comprises a plurality of bends so that a length of the spring beam is larger than a distance between the rigid beam and the slider setting portion, the bends being formed in a common plane;

providing piezoelectric elements and mounting the piezoelectric elements to the piezoelectric element setting portion of the flexure; and providing a slider and mounting the slider to the slider setting portion of the flexure.

18. A disk drive unit comprising:
a head gimbal assembly;
a drive arm to connect the head gimbal assembly;
a disk; and
a spindle motor to spin the disk;
wherein the head gimbal assembly comprises:
a slider;
a micro-actuator having piezoelectric elements; and
a suspension for supporting the slider and the micro-actuator, the suspension comprising a flexure having a tongue region and an outrigger, the tongue region comprising a slider setting portion for mounting the slider, and a piezoelectric element setting portion for mounting the piezoelectric elements, the outrigger having a pair of rigid beams and a pair of spring beams, the pair of rigid beams respectively coupling the flexure at opposite sides of the tongue region, the pair of spring beams each having one end thereof connected to a free end of the corresponding rigid beam and the other end thereof extending to a middle region of the slider setting portion of the flexure so as to support the slider; wherein each spring beam comprises a plurality of bends so that a length of the spring beam is larger than a distance between the rigid beam and the slider setting portion, the bends being formed in a common plane.

* * * * *